United States Patent [19]
Shibasaki

[11] Patent Number: 5,729,247
[45] Date of Patent: Mar. 17, 1998

[54] SCREEN DISPLAY DEVICE

[75] Inventor: Takeshi Shibasaki, Tokyo, Japan

[73] Assignee: Mitsubishi Denki Kabushiki Kaisha, Tokyo, Japan

[21] Appl. No.: 572,024

[22] Filed: Dec. 14, 1995

[30] Foreign Application Priority Data

Jul. 26, 1995 [JP] Japan ................................. 7-190872

[51] Int. Cl.$^6$ ..................................................... G09G 5/00
[52] U.S. Cl. .......................... 345/113; 345/508; 348/584
[58] Field of Search ................................. 348/584, 586, 348/588, 589–600; 345/4, 113, 114, 185, 192, 201, 508; 359/501, 523

[56] References Cited

U.S. PATENT DOCUMENTS

| | | |
|---|---|---|
| 4,496,976 | 1/1985 | Swanson et al. ........................ 345/201 |
| 5,008,750 | 4/1991 | Gomikawa ............................... 348/588 |
| 5,012,342 | 4/1991 | Olsen et al. ............................. 348/600 |
| 5,469,224 | 11/1995 | Her .......................................... 348/589 |
| 5,559,554 | 9/1996 | Uekane et al. .......................... 348/589 |

Primary Examiner—Richard Hjerpe
Assistant Examiner—Lun-Yi Lao
Attorney, Agent, or Firm—Burns, Doane, Swecker & Mathis, LLP

[57] ABSTRACT

A screen display device includes a first superimposing circuit for superimposing a first additional signal representing a first information such as characters and patterns stored in a character ROM on a composite video signal off the vertical blanking period thereof, and a second superimposing circuit for superimposing a second additional signal representing a second information such as service data stored in a data RAM or a data ROM on the composite video signal during the vertical blanking period thereof, so as to output two kinds of superimposition composite video signals to the single kind of composite video signal.

14 Claims, 10 Drawing Sheets

SCREEN DISPLAY DEVICE

BACKGROUND OF THE INVENTION

1. Field of the Invention

The present invention relates generally to a display apparatus, and more particularly to a screen display device used in a display apparatus which can superimpose additional information such as characters and patterns on a display video image.

2. Description of Related Art

The known screen display device capable of superimposing characters and patterns on a display video image uses a composite video signal, and an additional signal representing the additional information is superimposed on the video image display region off the vertical blanking period of the composite video signal.

Figure 1:
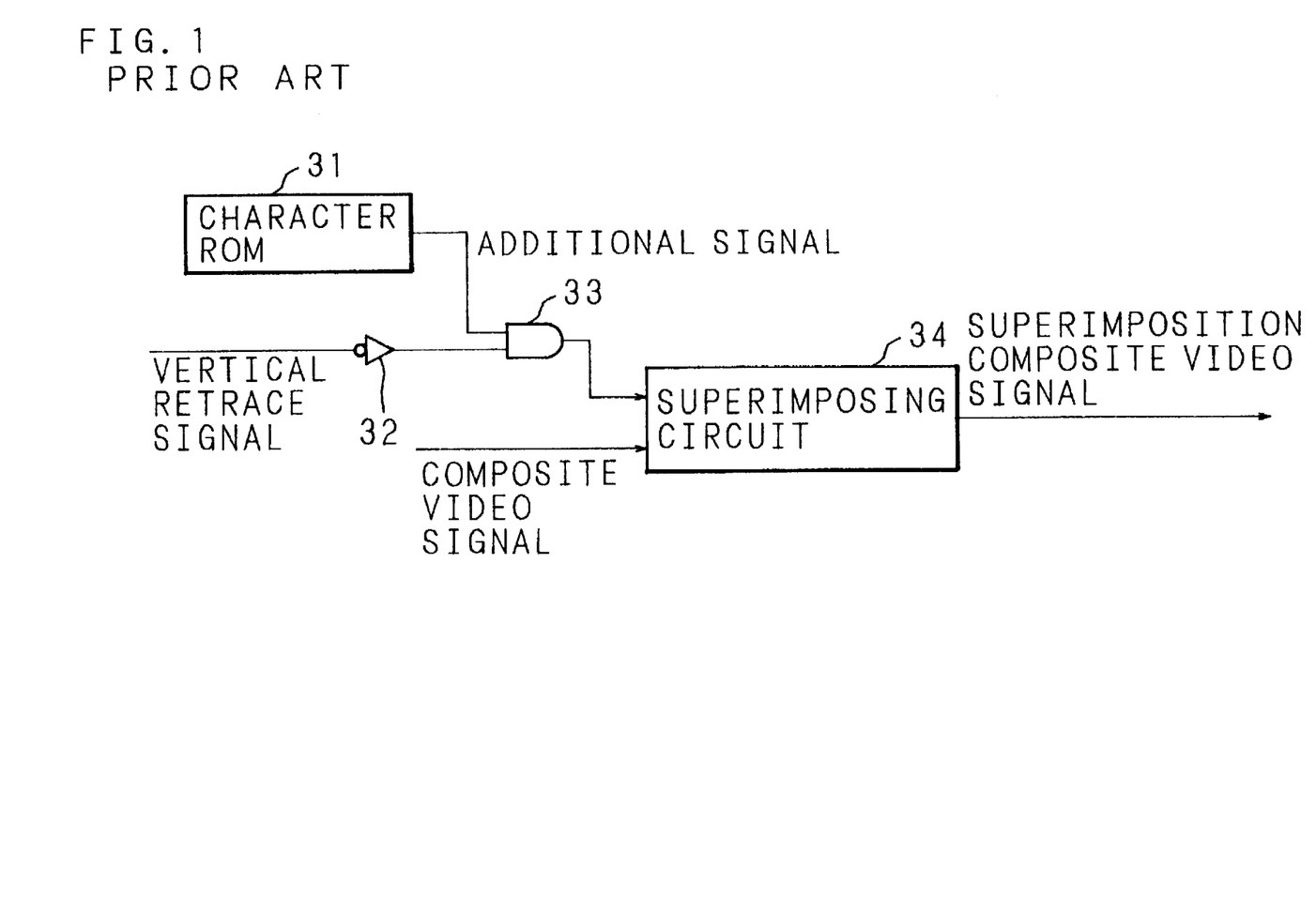
FIG. 1 is a block diagram exemplifying the structure of the prior art screen display device.

The known screen display device will be more particularly described referring to FIG. 1 showing the structure of it.

Figure 2:
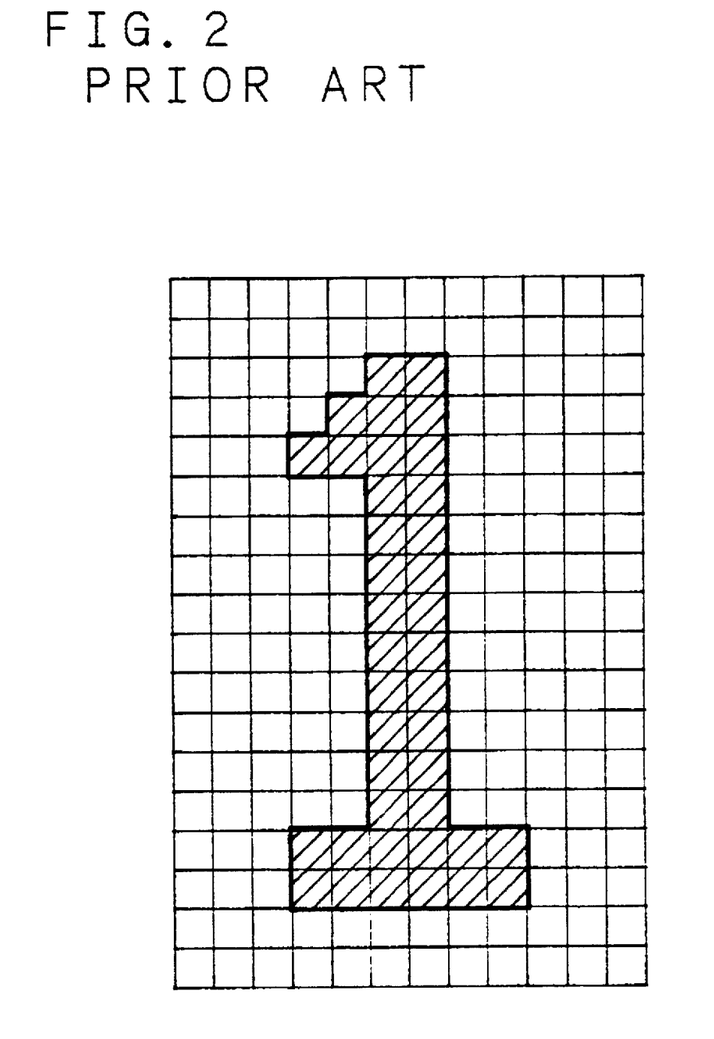
FIG. 2 is a view showing an example of a font stored in the character ROM.

The illustrated screen display device includes a character ROM 31, an inverter 32, a two-input AND circuit 33 and a superimposing circuit 34. The character ROM 31 stores additional information such as characters and patterns to be superimposed on a composite video signal, and outputs a signal representing the additional information to one of the inputs of the AND circuit 33. FIG. 2 shows an example of a font stored in the character ROM 31. The inverter 32 receives a signal representing a vertical blanking period (hereinafter, this signal will be referred to as "vertical retrace signal") of the composite signal, and after inverting it, outputs it to the other input of the AND circuit 33. The AND circuit 33 obtains the logical product of the outputs from both the character ROM 31 and the inverter 32, and outputs the logical product to the superimposing circuit 34. In this way the AND circuit 33 outputs an additional signal from the character ROM 31 to one of the inputs of the superimposing circuit 34 off the vertical blanking period of the composite signal. The other input of the superimposing circuit 34 receives a composite video signal inputted from the outside. The superimposing circuit 34 generates a superimposition composite video signal by superimposing an additional signal from the AND circuit 33 on the composite video signal supplied from the outside, and outputs the superimposition composite video signal to a display unit (not shown).

The known screen display device described above is operated as follows.

An additional signal to be superimposed on a composite video signal is inputted to the AND circuit 33 from the character ROM 31, and a vertical retrace signal is inverted by the inverter 32 and then inputted to the AND circuit 33. Owing to the logical product obtained by the AND circuit 33, the additional signal is always inputted to the superimposing circuit 34 off the vertical blanking period of the composite video signal. The additional signal is superimposed on the composite video signal in the superimposing circuit 34. The superimposition composite video signal, wherein a desired additional signal is superimposed in the image display area off the vertical blanking period, is outputted to the display unit from the superimposing circuit 34. And, a desired additional information is displayed with superimposition in the screen of the display unit.

It is also known in the art that a signal representing a further information such as service data is superimposed on the composite video signal. In this case, it is common practice to previously superimpose an additional signal representing the further information (e.g. service data) on a composite vide signal supplied from a TV station during the vertical blanking period thereof.

As is evident from the foregoing description, the known screen display device is disadvantageous in that an additional signal representing the additional information must be superimposed on the composite video signal off the vertical blanking period thereof. Alternatively, the additional signal is already superimposed during the vertical blanking period. In either case, it is inconvenient for the users, so that the practical value of the screen display device is traded off.

SUMMARY OF THE INVENTION

It is an object of the present invention to provide a screen display device which obtains a superimposition composite video signal by superimposing an additional signal on a composite video signal off the vertical blanking period thereof, and also obtains another superimposition composite video signal by superimposing a further additional signal on the same composite video signal during the vertical blanking period thereof, thereby providing two kinds of superimposition composite video signals, and increasing the number of usable patterns of superimposition composite video signals. Thus the present invention facilitates the use of screen display devices.

Another object of the present invention is to provide a screen display device which obtains a superimposition composite video signal by superimposing an additional signal on a composite video signal off the vertical blanking period thereof, obtains another superimposition composite video signal by superimposing a further additional signal on the same composite video signal during the vertical blanking period thereof, and extracts the additional signal superimposed on the composite video signal during the vertical blanking period thereof, thereby providing two kinds of superimposition composite video signals and one kind of additional signal, and increasing the number of usable patterns of superimposition composite video signals. Thus the present invention facilitates the use of screen display devices.

According to one aspect of the present invention, the screen display device includes a first superimposition system for superimposing a first additional signal representing a first information read from a first memory on the composite video signal off the vertical blanking period thereof, and a second superimposing system for superimposing a second additional signal representing a second information read from the first memory or a second memory on the composite video signal during the vertical blanking period thereof, thereby ensuring that two kinds of superimposition composite video signals are outputted on the basis of a single composite video signal inputted from the outside.

According to another aspect of the present invention, the screen display device includes a first superimposition system for superimposing a first additional signal representing a first information read from a first memory on the composite video signal off the vertical blanking period thereof, a second superimposing system for superimposing a second additional signal representing a second information read from the first memory or a second memory on the composite video signal during the vertical blanking period thereof, and an extracting circuit for extracting the second additional signal superimposed on the composite video signal during the vertical blanking period thereof, thereby ensuring that two kinds of superimposition composite video signals and a single kind of additional signal are outputted on the basis a single composite video signal inputted from the outside.

The above and further objects and features of the invention will more fully be apparent from the following detailed description with the accompanying drawings.

DESCRIPTION OF THE PREFERRED EMBODIMENTS

The present invention will be described in greater detail by way of example by reference to the accompanying drawings:

Embodiment 1

Figure 3:
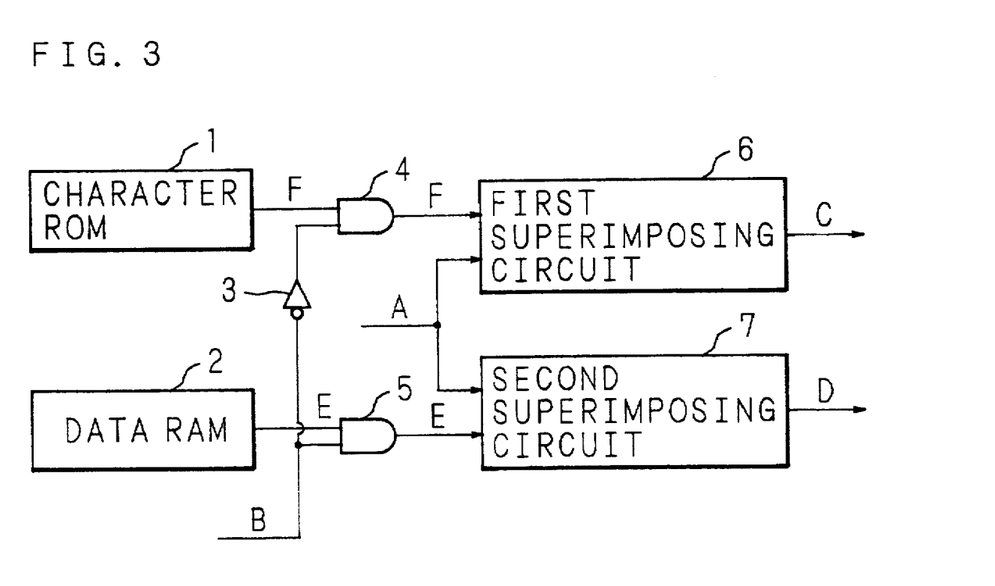
FIG. 3 is a block diagram exemplifying the structure of Embodiment 1 of the present invention.

FIG. 3 is a diagram showing the structure of the screen display device of Embodiment 1 of the present invention. The screen display device illustrated in FIG. 3 includes a character ROM 1, a data RAM 2, an inverter 3, two-input AND circuits 4 and 5, a first superimposing circuit 6, and a second superimposing circuit 7. The character ROM 1 provides a source for storing a first additional information such as characters and patterns to be superimposed on a composite video signal A, and outputs a first additional signal F representing the first additional information to one of the inputs of the AND circuit 4. The data RAM 2 provides a source for storing a second additional information such as service information to be superimposed on the composite video signal A, and outputs a second additional signal E representing the second additional information to one of the inputs of the AND circuit 5.

The inverter 3 receives a vertical retrace signal B representing a vertical blanking period of the composite video signal A, and after inverting it, inputs the inverted vertical retrace signal to the other input terminal of the AND circuit 4. An uninverted portion of the vertical retrace signal B is inputted to the other input of the AND circuit 5. The AND circuit 4 obtains the logical product of the outputs from both the character ROM 1 and the inverter 3, and outputs it to the first superimposing circuit 6. More specifically, the AND circuit 4 outputs the first additional signal F supplied from the character ROM 1 to one of the inputs of the first superimposing circuit 6 off the vertical blanking period of the composite video signal A. The AND circuit 5 obtains the logical product of the output of the data RAM 2 and the vertical retrace signal B, and outputs it to the second superimposing circuit 7. More specifically, the AND circuit 5 outputs the second additional signal E supplied from the data RAM 2 to one of the inputs of the second superimposing circuit 7 during the vertical blanking period of the composite video signal A.

The first and second superimposing circuits 6, 7 receive the composite video signal A from the outside at the other inputs thereof. The first superimposing circuit 6 produces a first superimposition composite video signal C by superimposing the first additional signal F supplied from the AND circuit 4 on the composite video signal A supplied from the outside off the vertical blanking period thereof, and then outputs it. The superimposing circuit 7 produces a second superimposition composite video signal D by superimposing the second additional signal E supplied from the AND circuit 5 on the composite video signal A supplied from the outside during the vertical blanking period thereof, and then outputs it.

Figure 4:
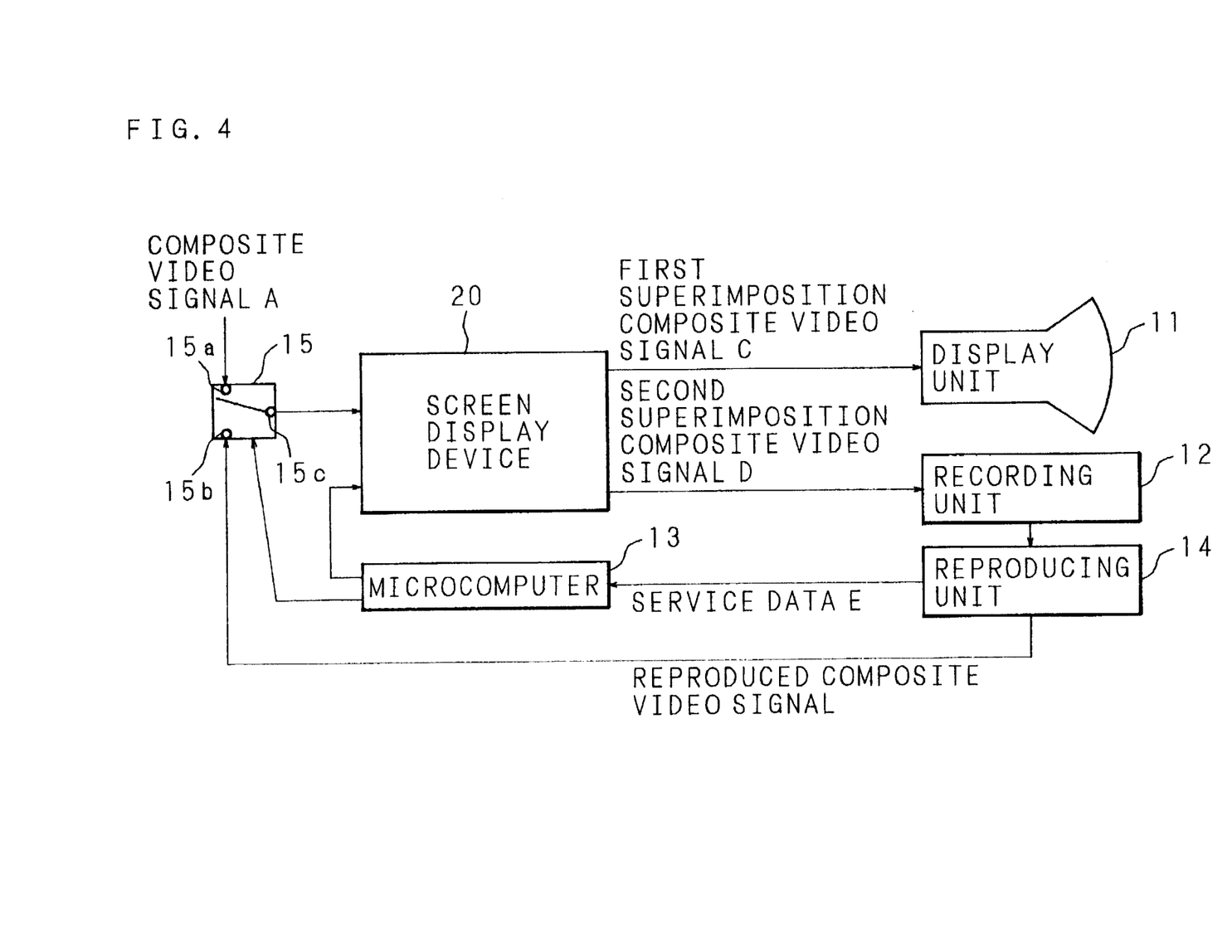
FIG. 4 is a block diagram exemplifying the structure of a system under which the output signals from the screen display device according to Embodiments 1 to 3 are processed.
Figure 5A:
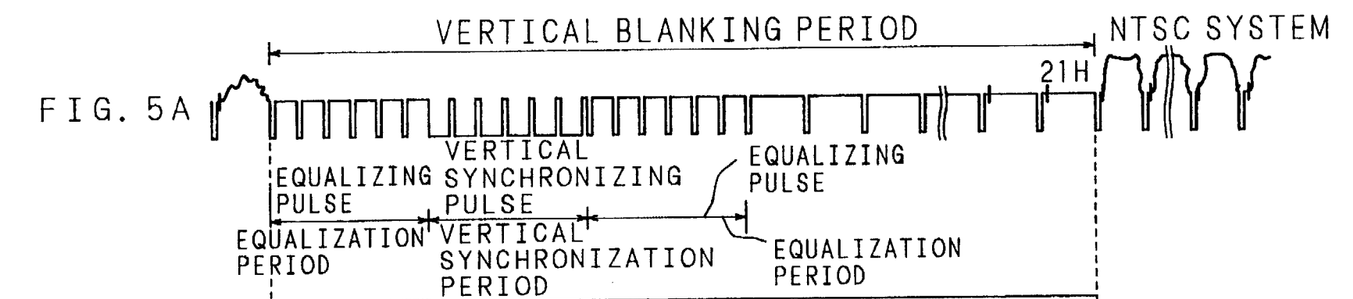
FIGS. 5A to 5E are diagrammatic views showing the waveforms of various signals processed by the screen display device according to the present invention.
Figures 5B, 5C:
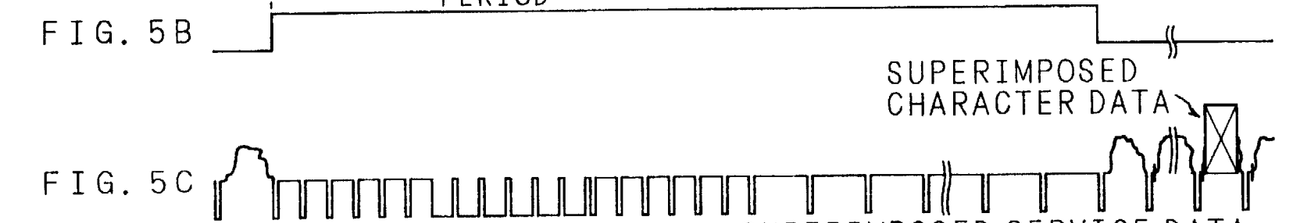
Figure 5D:
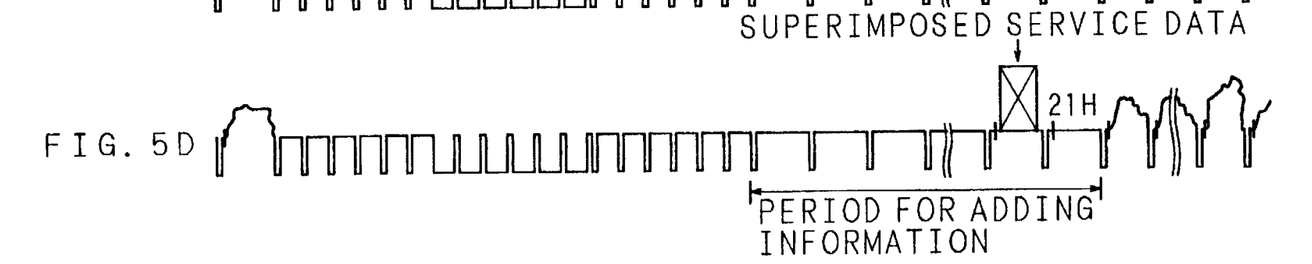
Figure 5E:
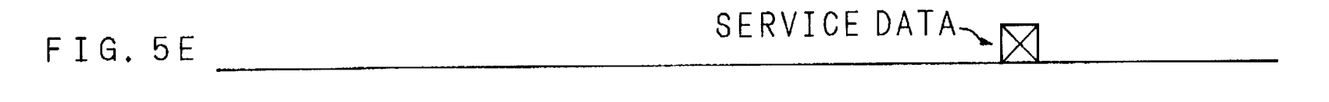

Referring to FIG. 4, the processing of the first and second superimposition composite video signals C, D will be described.

The illustrated system include a screen display device 20, a microcomputer 13, a switch 15 having two inputs 15a, 15b and one output 15c, a display unit 11, a recording unit 12, and a reproducing unit 14. The screen display device 20 has the structure shown in FIG. 3, and outputs the first superimposition composite video signal C to the display unit 11 such as a CRT display screen, and outputs the second superimposition composite video signal D to the recording unit 12 such as a magnetic recording device. The display unit 11 displays a video image corresponding to the first superimposition composite video signal C. The recording unit 12 records the second superimposition composite video signal D in a magnetic tape or any other medium incorporated therein. The reproducing unit 14 such as a magnetic reproducing device is provided so as to reproduce the second superimposition composite video signal D recorded in the recording unit 12, and outputs a reproduced signal to the input 15b of the switch 15. The switch 15 receives a composite video signal having no superimposed additional signal from the outside at the other input 15a.

When the second superimposition composite video signal D is reproduced, the reproducing unit 14 can extract the second additional signal (service data) E superimposed thereon, and outputs it to the microcomputer 13. The microcomputer 13 controls the operation of the screen display device 20, and sends the extracted service data inputted thereto to the screen display device 20. The microcomputer 13 outputs a switch-over signal to the switch 15 so that the output 15c of the switch 15 is connected to either the input 15a or 15b.

Referring to FIG. 5 showing the waveforms of various signals, the operation of the screen display device 20 will be described. FIG. 5A, FIG. 5B, FIG. 5C, FIG. 5D and FIG. 5E show the composite video signal A from the outside, the vertical retrace signal B, the first superimposition composite video signal C, the second superimposition composite video signal D and the second additional signal (service data) E, respectively.

The first additional signal (characters data) F to be superimposed on the composite video signal A is inputted to the AND circuit 4 from the character ROM 1, and the vertical retrace signal B is inverted by the inverter 3 and inputted to the AND circuit 4. Owing to the logical product obtained by the AND circuit 4, the character data F is inputted to the first superimposing circuit 6 only off the vertical period. The character data F is superimposed on the composite video signal A already inputted in the first superimposing circuit 6. The first superimposition composite video signal C contains a superimposition of the character data F in the display region off the vertical blanking period of the composite video signal, and is outputted to the display unit 11 from the first superimposing circuit 6. In this way a video image having a desired superimposed character information is displayed on the screen.

The second additional signal (service data) E to be superimposed on the composite video signal A is inputted to the AND circuit 5 from the data RAM 2, and also the vertical retrace signal B is inputted to the AND circuit 5 without being inverted by the inverter 3. Owing to the logical product obtained by the AND circuit 5, the service data E is inputted to the second superimposing circuit 7 only during the vertical blanking period. The service data E is superimposed on the composite video signal A already inputted in the second superimposing circuit 7. In this way the second superimposition composite video signal D having the service data E superimposed during the vertical blanking period is outputted to the recording unit 12 from the second superimposing circuit 7, and is recorded in the recording medium therein.

As is evident from the foregoing description, two kinds of additional information (character information and service information) are superimposed on a single kind of composite video signal A, and two kinds of superimposition composite video signals (the first superimposition composite video signal C and the second superimposition composite video signal D) are outputted.

The second superimposition composite video signal D recorded in the recording unit 12 is reproduced in the reproducing unit 14, and the reproduced signal is outputted to the switch 15. Simultaneously, the service data E superimposed on the second superimposition composite video signal D is extracted, and is inputted to the screen display device 20 through the microcomputer 13.

By switching over from the input 15a of the switch 15 to the other input 15b or vice versa, the composite video signal to be inputted to the screen display device 20 can be changed to the composite video signal A inputted from the outside and the reproduced second superimposition composite video signal D. This indicates the capability of superimposing not only an additional signal on the composite video signal inputted from the outside but also a further additional signal on the composite video signal already having an additional signal superimposed. In addition, the additional signal already superimposed on the composite vide signal can be again inputted to the screen display device 20. It will be appreciated from it that the same additional signal can be repeatedly superimposed on the composite video signal.

Embodiment 2

Figure 6:
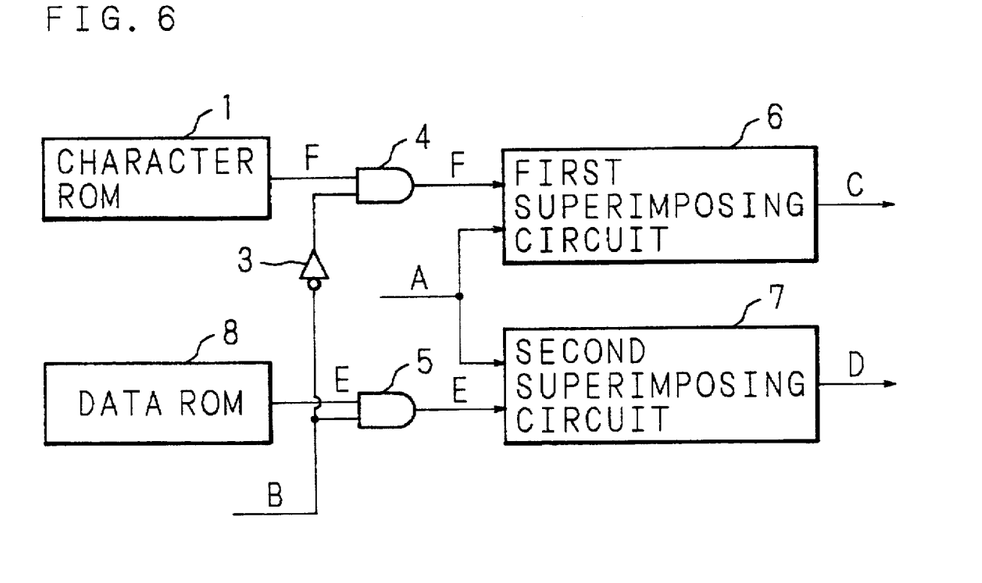
FIG. 6 is a block diagram exemplifying the structure of Embodiment 2 of the present invention.

FIG. 6 is a diagram showing the structure of the screen display device of Embodiment 2 of the present invention. The screen display device illustrated in FIG. 6 includes a character ROM 1, a data ROM 8, an inverter 3, two-input AND circuits 4, 5, a first superimposing circuit 6, and a second superimposing circuit 7. The data ROM 8 provides a source for storing a second additional information such as service information to be superimposed on a composite video signal A. The other portion of the structure is the same as that of Embodiment 1.

Embodiment 2 is different from Embodiment 1 in that the data RAM 2 in Embodiment 1 is replaced with the data ROM 8. In general, service information covers a variety of items but they are applicable to every composite video signal, so that the service information need not be frequently rewritten. This eliminates the necessity of using a RAM but a ROM will suffice as the source of information. Embodiment 2 is more advantageous than embodiment 1 in that the size of the circuit and the production cost can be reduced.

As shown in FIGS. 5A to 5E, Embodiment 2 also allows the first and second superimposition composite video signals C, D to be outputted in the same manner as Embodiment 1. The operation of the screen display device 20, and the manner and effect of using two kinds of superimposition composite video signals C, D are the same as those in Embodiment 1, and the description will be omitted.

Embodiment 3

Figure 7:
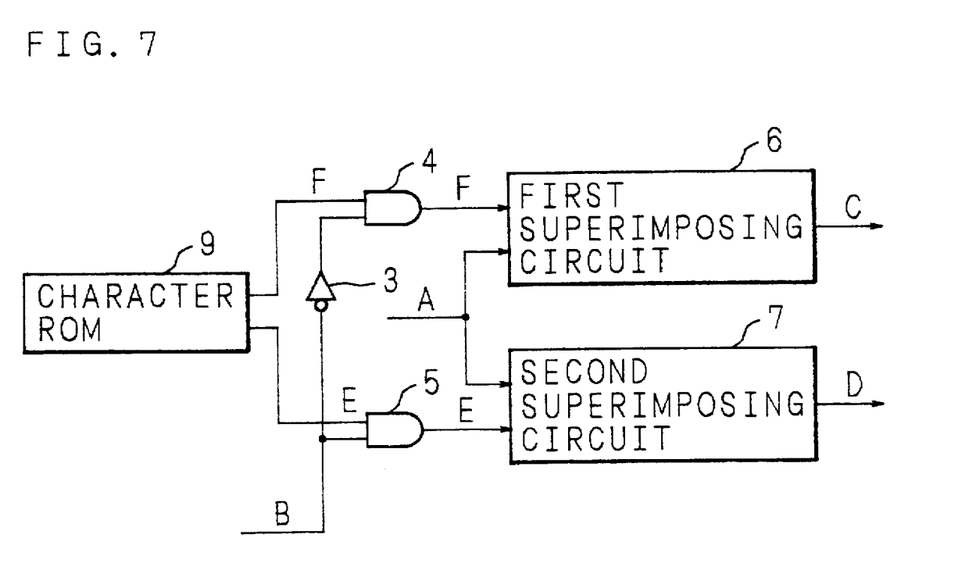
FIG. 7 is a block diagram exemplifying the structure of Embodiment 3 of the present invention.

FIG. 7 is a diagram showing the structure of the screen display device of Embodiment 3 of the present invention. The screen display device illustrated in FIG. 7 includes a character ROM 9, an inverter 3, two-input AND circuits 4 and 5, a first superimposing circuit 6, and a second superimposing circuit 7. Embodiment 3 is characterized in that the character ROM 9 provides s source for storing a first additional information such as characters and patterns, and also a source for storing a second additional information such as service information to be superimposed on a composite video signal A. The character ROM 9 outputs the first additional signal (character data) F to the AND circuit 4, and the second additional signal (service data) E to the AND circuit 5. The other portion of the structure is the same as that of Embodiment 1.

As shown in FIGS. 5A to 5E, Embodiment 3 also outputs the first and second superimposition composite video signals C, D in the same manner as Embodiment 1. The operation of the screen display device 20 and the manner and effect of using two kinds of superimposition composite video signals C, D are the same as those in Embodiment 1, and the description will be omitted.

Embodiment 3 is characterized in that the character ROM 9 provides a single source for storing the two kinds of additional information, thereby obtaining the two kinds of additional signals E, F from the single memory (character ROM 9). Embodiment 3 can reduce the size of the circuit and the production cost more than Embodiment 2.

Embodiment 4

Figure 8:
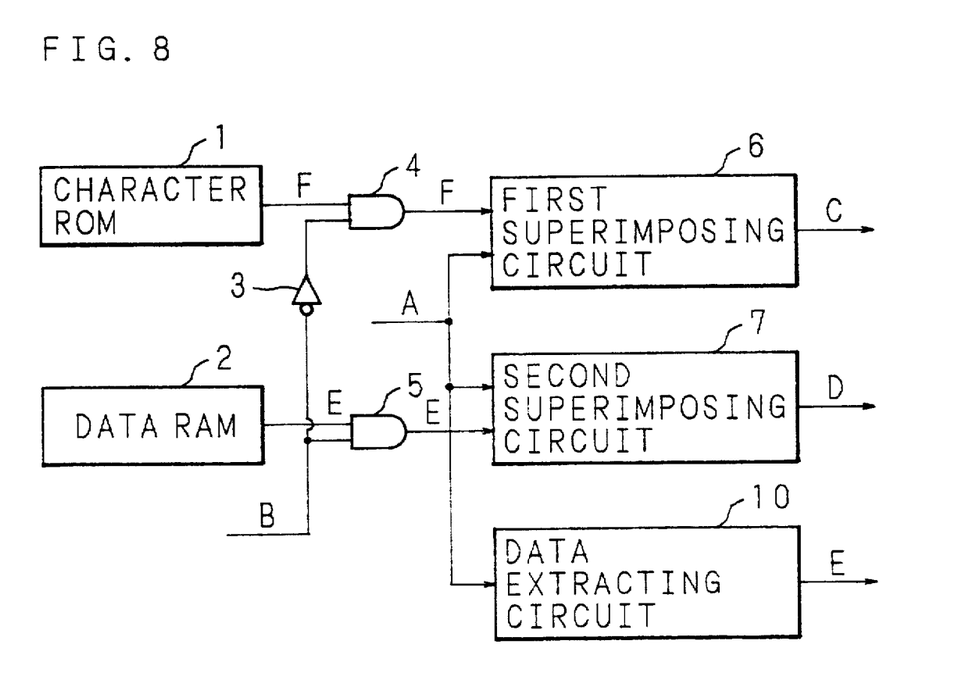
FIG. 8 is a block diagram exemplifying the structure of Embodiment 4 of the present invention.

FIG. 8 is a diagram showing the structure of the screen display device of Embodiment 4 of the present invention. The screen display device illustrated in FIG. 8 includes a character ROM 1, a data RAM 2, an inverter 3, two-input AND circuits 4, 5, a first superimposing circuit 6, a second superimposing circuit 7, and a data extracting circuit 10. The data extracting circuit 10 extracts the second additional signal E already superimposed during the vertical blanking period of the composite video signal A from a superimposition composite video signal inputted thereto, and then outputs the extracted second additional signal E as a digital output signal. The other portion of the structure is the same as that of Embodiment 1.

Embodiment 5

Figure 9:
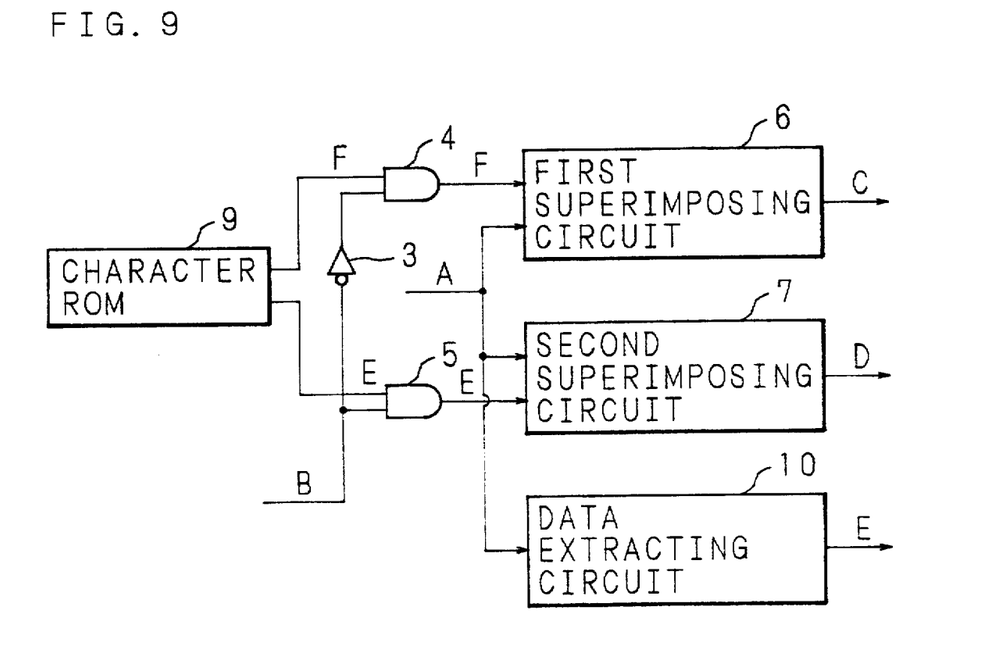
FIG. 9 is a block diagram exemplifying the structure of Embodiment 5 of the present invention.

FIG. 9 is a diagram showing the structure of the screen display device of Embodiment 5 of the present invention. The screen display device illustrated in FIG. 9 includes a character ROM 9, an inverter 3, two-input AND circuits 4, 5, a first superimposing circuit 6, a second superimposing circuit 7, and a data extracting circuit 10. The character ROM 9 provides a source for storing two kinds of additional information (i.e. first and second additional information). The data extracting circuit 10 extracts the second additional signal E already superimposed during the vertical blanking period of the composite video signal A from a superimposition composite video signal inputted thereto, and then outputs the extracted second additional signal E as a digital output signal. The other portion of the structure is the same as that of Embodiment 3.

Figure 10:
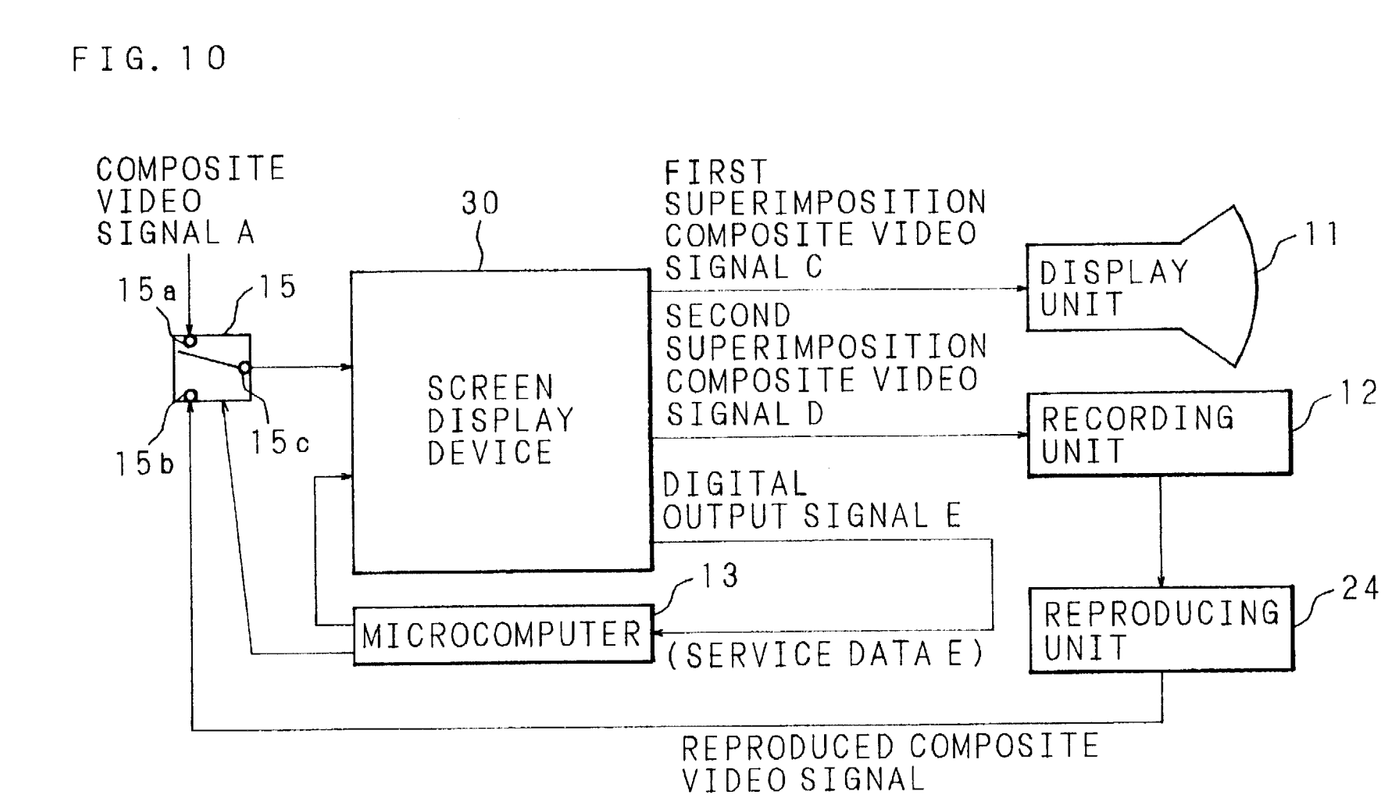
FIG. 10 is a block diagram exemplifying the structure of a system under which the output signals from the screen display device according to Embodiments 4, 5 are processed.

Referring to FIG. 10, wherein like reference numerals designate like components and elements to those in FIG. 4, the system of processing the first and second superimposition composite video signals C, D and the digital output signal (the extracted second additional signal) E in Embodiments 4, 5 will be described:

The screen display device 30 has the structure shown in FIG. 8 or FIG. 9, and outputs the first and second superimposition composite video signals C, D to the display unit 11 and the recording unit 12, respectively. The screen display device 30 also outputs the extracted digital output signal E to the microcomputer 13. A reproducing unit 24 such as a magnetic reproducing device is additionally provided so as to reproduce the second superimposition composite video signal D recorded in the recording unit 12, and output the reproduced signal to the input 15b of the switch 15. The display unit 11, the recording unit 12, the microcomputer 13 and the switch 15 are operated in the same manner as in Embodiment 1.

In the above-described Embodiments 1 to 3, the second additional signal E superimposed on the second superimposition composite video signal D is extracted by the reproducing unit 14 (see FIG. 4) disposed outside the screen display device 20. In Embodiments 4, 5, this extracting process is performed by the data extracting circuit 10 integrated in the screen display device 30. Other portion of the structure and operation is the same as that of Embodiment 1, and the description will be omitted.

In the same manner as Embodiments 1 to 3, Embodiments 4, 5 can superimpose different kinds of additional information like character information and service information on a single kind of composite video signal A (FIG. 5A) so as to output the first and second superimposition composite video signals C, D (FIGS. 5C and 5D) corresponding to the kinds of the information. In addition, Embodiments 4, 5 can output the digital output signal E representing the second additional information (service information) already superimposed during the vertical blanking period of the composite video signal A. This additional advantage enhances the handiness of the screen display device compared with Embodiments 1 to 3. Embodiment 4, 5 do not require the extracting function for superimposed data to an outer reproducing unit.

In the foregoing description of Embodiments 1 to 5, it is supposed that the composite video signal inputted from the outside has no superimposed additional signal but the present invention is applicable to composite video signals having any additional information superimposed at a TV station.

The screen display device according to Embodiments 1 to 3 outputs a first superimposition composite video signal and a second superimposition composite video signal to a single kind of composite video signal inputted from the outside, wherein the first superimposition composite signal is obtained by superimposing a character and/or pattern information on the composite video signal off the vertical blanking period thereof and the second superimposition composite signal is obtained by superimposing service information on the composite video signal during the vertical blanking period thereof. Embodiment 4, 5 are more advantageous in that, in addition to the first and second superimposition composite video signals, a digital output signal is obtained by extracting the service information superimposed on the composite video signal. Thus the present invention facilitates the use of screen display devices, and enhances the practical value of superimposition composite video signals.

For example, in AV apparatus such as a VTR it is possible to read service data, etc. already superimposed during the vertical blanking period of the composite video signal while reproduction goes on, and add more value to the reproduced video image in accordance with the importance of the data, without superimposing characters and patterns in the display region while recording goes on.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. A screen display device for displaying a video image having a superimposition of additional information, comprising:

a first memory for storing first information;

first superimposing means for superimposing a first additional signal representing the first information read out from the first memory on a single composite video signal inputted from outside a vertical blanking period thereof;

a second memory for storing second information; and second superimposing means for superimposing a second additional signal representing the second information read out from the second memory on the single composite video signal during the vertical blanking period thereof;

wherein two kinds of superimposition composite video signals are obtained by the first and second superimposing means, with respect to the single composite video signal.

2. The screen display device according to claim 1, wherein the second memory is a data RAM.

3. The screen display device according to claim 1, wherein the second memory is a data ROM.

4. A screen display device for displaying a video image having a superimposition of additional information, comprising:

a memory for storing first information and second information;

first superimposing means for superimposing a first additional signal representing the first information read out from the memory on a single composite video signal inputted from outside a vertical blanking period thereof; and second superimposing means for superimposing a second additional signal representing the second information read out from the memory on the single composite video signal during the vertical blanking period thereof;

wherein two kinds of superimposition composite video signals are obtained by the first and second superimposing means, with respect to the single composite video signal inputted from the outside.

5. A screen display device for displaying a video image having a superimposition of additional information, comprising:

a first memory for storing first information;

first superimposing means for superimposing a first additional signal representing the first information read out from the first memory on a single composite video signal inputted from outside a vertical blanking period thereof;

a second memory for storing second information; and second superimposing means for superimposing a second additional signal representing the second information read out from the second memory on the single composite video signal during the vertical blanking period thereof; and extracting means for extracting the second additional signal superimposed during the vertical blanking period of the composite video signal;

wherein two kinds of superimposition composite video signals and a single kind of additional signal are obtained by the first and second superimposing means, with respect to the single composite video signal inputted from the outside.

6. A screen display device for displaying a video image having a superimposition of additional information, comprising:

a memory for storing first information and second information;

first superimposing means for superimposing a first additional signal representing the first information read out from the memory on a single composition video signal inputted from outside a vertical blanking period thereof;

second superimposing means for superimposing a second additional signal representing the second information read out from the memory on the single composite video signal during the vertical blanking period thereof; and extracting means for extracting the second additional signal superimposed during the vertical blanking period of the composite video signal;

wherein two kinds of superimposition composite video signals and a single kind of additional signal are obtained by the first and second superimposing means, with respect to the single composite video signal inputted from the outside.

7. A screen display device for displaying a video image having a superimposition of additional information, comprising:

superimposition composite video signal generating means comprising:

a first memory for storing first information;

first superimposing means for superimposing a first additional signal representing the first information read out from the first memory on a single composite video signal inputted from outside a vertical blanking period thereof;

a second memory for storing second information; and second superimposing means for superimposing a second additional signal representing the second information read out from the second memory on the single composite video signal during the vertical blanking period thereof;

display means for displaying a superimposed video image corresponding to a superimposition composite video signal sent from the first superimposing means;

recording means for recording a superimposition composite video signal sent from the second superimposing means;

reproducing means for reproducing a superimposition composite video signal recorded in the recording means; and extracting means for extracting the second additional signal from the reproduced superimposition composite video signal and outputting the extracted second additional signal to the superimposition composite video signal generating means.

8. The screen display device according to claim 7, further comprising a switch for switching over between a composite video signal inputted from the outside and a superimposition composite video signal reproduced by the reproducing means, and determining the superimposition composite video signal to be inputted to the superimposition composite video signal generating means.

9. A screen display device for displaying a video image having a superimposition of additional information, comprising:

superimposition composite video signal generating means comprising:

a memory for storing first information and second information;

first superimposing means for superimposing a first additional signal representing the first information read out from the memory on a composite video signal inputted from outside a vertical blanking period thereof; and second superimposing means for superimposing a second additional signal representing the second information read out from the memory on the composite video signal during the vertical blanking period thereof;

display means for displaying a superimposed video image corresponding to a superimposition composite video signal sent from the first superimposing means;

recording means for recording a superimposition composite video signal sent from the second superimposing means;

reproducing means for reproducing a superimposition composite video signal recorded in the recording means; and extracting means for extracting the second additional signal from the reproduced superimposition composite video signal and outputting the extracted second additional signal to the superimposition composite video signal generating means.

10. The screen display device according to claim 9, further comprising a switch for switching over between a composite video signal inputted from the outside and a superimposition composite video signal reproduced by the reproducing means, and determining the superimposition composite video signal to be inputted to the superimposition composite video signal generating means.

11. A screen display device for displaying a video image having a superimposition of additional information, comprising:

superimposition composite video signal generating means comprising:

a first memory for storing first information;

first superimposing means for superimposing a first additional signal representing the first information read out from the first memory on a composite video signal inputted from outside a vertical blanking period thereof;

a second memory for storing second information;

second superimposing means for superimposing a second additional signal representing the second information read out from the second memory on the composite video signal during the vertical blanking period thereof; and extracting means for extracting the second additional signal superimposed during the vertical blanking period of the composite video signal;

display means for displaying a superimposed video image corresponding to a superimposition composite video signal sent from the first superimposing means;

recording means for recording a superimposition composite video signal sent from the second superimposing means;

reproducing means for reproducing a superimposition composite video signal recorded in the recording means; and outputting means for outputting the second additional signal extracted by the extracting means to the superimposition composite video signal generating means.

12. The screen display device according to claim 11, further comprising a switch for switching over between a composite video signal inputted from the outside and a superimposition composite video signal reproduced by the reproducing means, and determining the superimposition composite video signal to be inputted to the superimposition composite video signal generating means.

13. A screen display device for displaying a video image having a superimposition of additional information, comprising:

superimposition composite video signal generating means comprising:

a memory for storing first information and second information;

first superimposing means for superimposing a first additional signal representing the first information read out from the memory on a composite video signal inputted from outside a vertical blanking period thereof;

second superimposing means for superimposing a second additional signal representing the second information read out from the memory on the composite video signal during the vertical blanking period thereof; and extracting means for extracting the second additional signal superimposed during the vertical blanking period of the composite video signal;

display means for displaying a superimposed video image corresponding to a superimposition composite video signal sent from the first superimposing means;

recording means for recording a superimposition composite video signal sent from the second superimposing means;

reproducing means for reproducing a superimposition composite video signal recorded in the recording means; and outputting means for outputting the second additional signal extracted by the extracting means to the superimposition composite video signal generating means.

14. The screen display device according to claim 13, further comprising a switch for switching over between a composite video signal inputted from the outside and a superimposition composite video signal reproduced by the reproducing means, and determining the superimposition composite video signal to be inputted to the superimposition composite video signal generating means.

* * * * *